US007017480B1

(12) United States Patent
Fracas

(10) Patent No.: US 7,017,480 B1
(45) Date of Patent: Mar. 28, 2006

(54) AUTOMATIC MACHINE FOR PHOTOENGRAVING SCREEN PRINTING PLATES FOR SCREEN PRINTING HIGH QUALITY COMPACT DISCS

(76) Inventor: Paolo Fracas, Via Milano, 14 I-22070 Appiano Gentile, Como (IT)

( * ) Notice: Subject to any disclaimer, the term of this patent is extended or adjusted under 35 U.S.C. 154(b) by 0 days.

(21) Appl. No.: 11/023,171

(22) Filed: Dec. 27, 2004

(51) Int. Cl.
*B41C 1/14* (2006.01)
*B41F 15/00* (2006.01)
*G06F 15/00* (2006.01)

(52) U.S. Cl. ..................... 101/128.4; 101/114; 358/1.7

(58) Field of Classification Search ............ 101/128.4, 101/128, 41–44, 114, 115–126, 129, 463.1; 400/120.1; 358/1.7
See application file for complete search history.

(56) References Cited

U.S. PATENT DOCUMENTS

| | | | | |
|---|---|---|---|---|
| 5,201,027 | A * | 4/1993 | Casini | 358/1.7 |
| 5,483,883 | A * | 1/1996 | Hayama | 101/128.4 |
| 6,302,017 | B1 * | 10/2001 | Kawai et al. | 101/128.4 |
| 6,305,284 | B1 * | 10/2001 | Watanabe et al. | 101/463.1 |
| 6,401,607 | B1 * | 6/2002 | Yoneoka | 101/129 |
| 6,637,325 | B1 * | 10/2003 | Inamine | 101/128.4 |
| 6,847,389 | B1 * | 1/2005 | Shiraishi | 347/134 |
| 2005/0062839 | A1 * | 3/2005 | Shiraishi | 347/238 |

* cited by examiner

*Primary Examiner*—Andrew H. Hirshfeld
*Assistant Examiner*—Wasseem H. Hamdan

(57) ABSTRACT

The present invention relates to an automatic machine for photoengraving or photoetching screen printing plates for screen-printing high quality compact discs or CD's, comprising a central control unit operatively coupled to a photoengraving station, including a frame or plate conveyor to convey printing frames or plates under a frame photoengraving assembly adapted to scan, by a polygonal mirror and a flat field lens, a laser light beam.

8 Claims, 5 Drawing Sheets

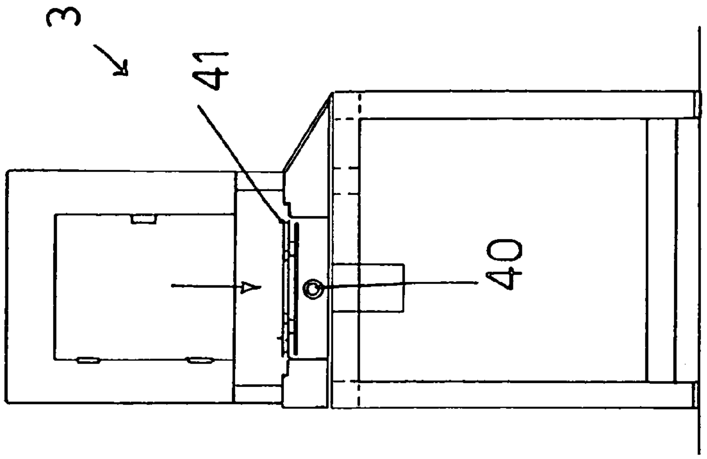
FIG 7
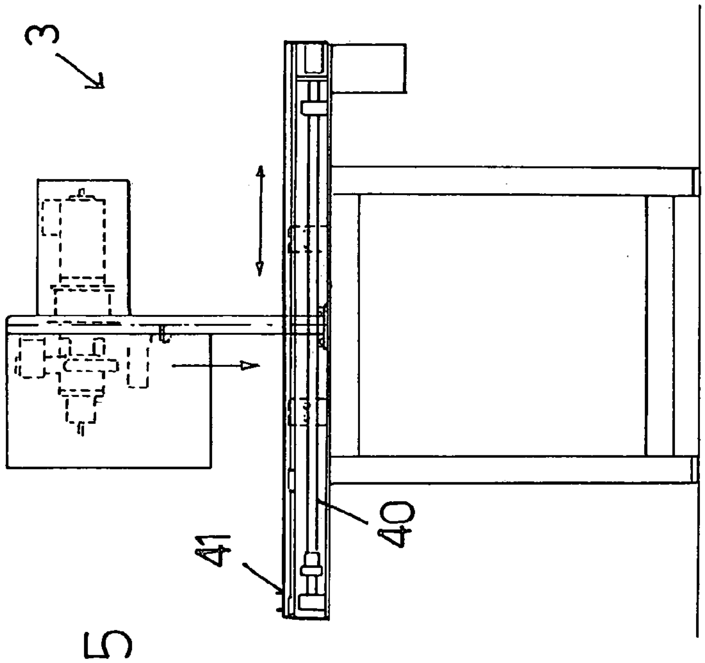
FIG 5
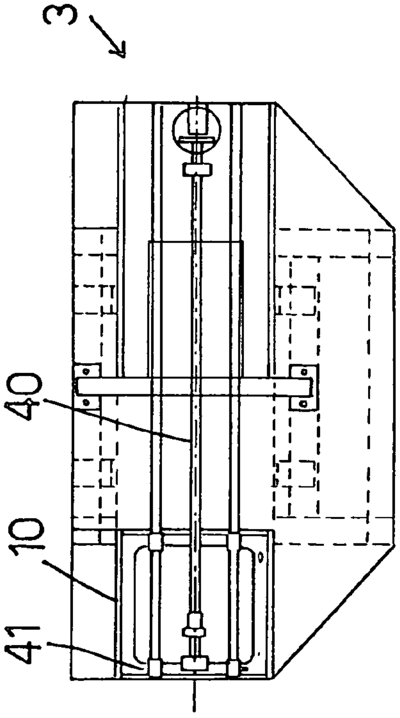
FIG 6
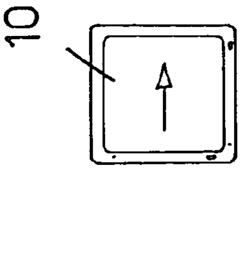

AUTOMATIC MACHINE FOR PHOTOENGRAVING SCREEN PRINTING PLATES FOR SCREEN PRINTING HIGH QUALITY COMPACT DISCS

BACKGROUND OF THE INVENTION

The present invention relates to an automatic machine for photoengraving or photoetching screen printing plates for screen printing high quality CD's.

Prior screen printing plate or frame photoengraving machines have a comparatively large size and, moreover, they require a continuous presence of an operator for setting the screen printing operations or procedures.

Another drawback of prior screen printing plate or frame photoengraving machines is that said machines are not reliable in operation, since they include a comparatively large number of movable parts which are subjected to wear phenomena, requiring the machine to be frequently stopped.

SUMMARY OF THE INVENTION

Accordingly, the aim of the present invention is to overcome the above mentioned drawbacks, by providing an automatic machine for photoengraving or photoetching screen printing plates or frames for printing high quality CD's, which is adapted to operate according to a continuous cycle, through the 24 hours of a day, without requiring any operators and with an exposure time within a minute.

Within the scope of the above mentioned aim, a main object of the present invention is to provide such an automatic machine allowing to provide high definition and resolution engraved or etched images, and this in an apparatus including a very small number of movable elements.

Another object of the present invention is to provide such an automatic machine which, owing to its specifically designed features, is very reliable and safe in operation.

Yet another object of the present invention is to provide such an automatic machine which can be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by an automatic machine for photoengraving screen printing plates for screen printing high quality CD's, characterized in that said automatic machine comprises a central control unit, operatively coupled to a photoengraving station including a printing frame conveyor, to convey printing frames under a photoengraving assembly for photoengraving said printing frames, said photoengraving assembly being adapted to scan, by a polygonal mirror and a flat-field lens, a laser light beam.

BRIEF DESCRIPTION OF THE DRAWINGS

Further characteristics and advantages of the present invention will become more apparent hereinafter from the following detailed disclosure of a preferred, thought not exclusive, embodiment of an automatic machine for photoengraving screen printing plates or frames for screen-printing high quality CD's, which is illustrated, by way of an indicative but not limitative example, in the accompanying drawings, where:

FIG. 5 is a front elevation view illustrating the automatic machine with a screw conveyor;

FIG. 6 is a top plan view illustrating the subject automatic machine;

FIG. 7 is a side elevation view illustrating the subject automatic machine;

DESCRIPTION OF THE PREFERRED EMBODIMENT

Figure 1:
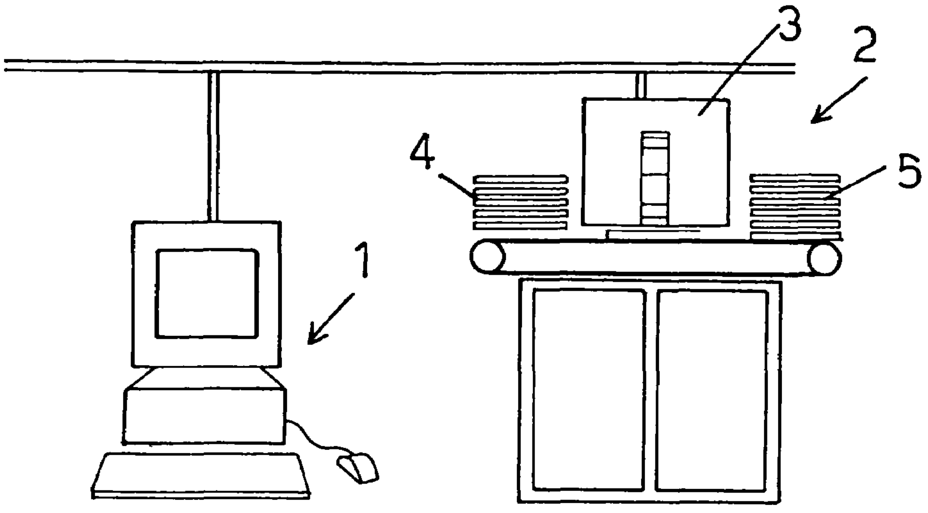
FIG. 1 is a schematic view illustrating the automatic machine according to the present invention.

With reference to the number references of the above mentioned figures, the automatic machine for photoengraving or photoetching screen printing plates or frames for screen printing high quality CD's, according to the present invention, comprises a central control unit including, for example, a computer, indicated by 1, which is operatively coupled to a photoengraving station, generally indicated by the reference number 2.

The photoengraving or photoetching station 2 comprises a photoengraving assembly, generally indicated by the reference number 3, which will be disclosed in a more detailed manner hereinafter, and which is arranged near a magazine 4 for feeding and properly arranging screen printing plates or frames 10, a further photoengraved or photoetched screen printing frame or plate unloading magazine 5 being moreover provided.

Said magazines 4 and 5 provide, in actual practice, loading and unloading units for respectively loading and unloading the screen printing plates or frames, allowing to remove frames from a vertical magazine, locate the removed frames under the photoengraving assembly and then transfer the photoengraved frames to the unloading magazine, thereby allowing the machine to operate without any operators.

The subject photoengraving machine or system can be easily started and operated, since it does not require setting operations; actually, it operates as a desk printing unit, and the photoengraving operation can be started by a simple "click" of a mouse.

Thus, the subject photoengraving assembly provides all the advantages of the digital technology.

This will allow to store the screen printing files in an electronic type of pattern, to allow a great reduction of the cost and time necessary for making the screen printing plate or frames.

Moreover, the screen printing frames or plates can be produced in a flexible manner, since it is possible to easily set a photoengraving procedure for different images for each printing frame.

Figure 2:
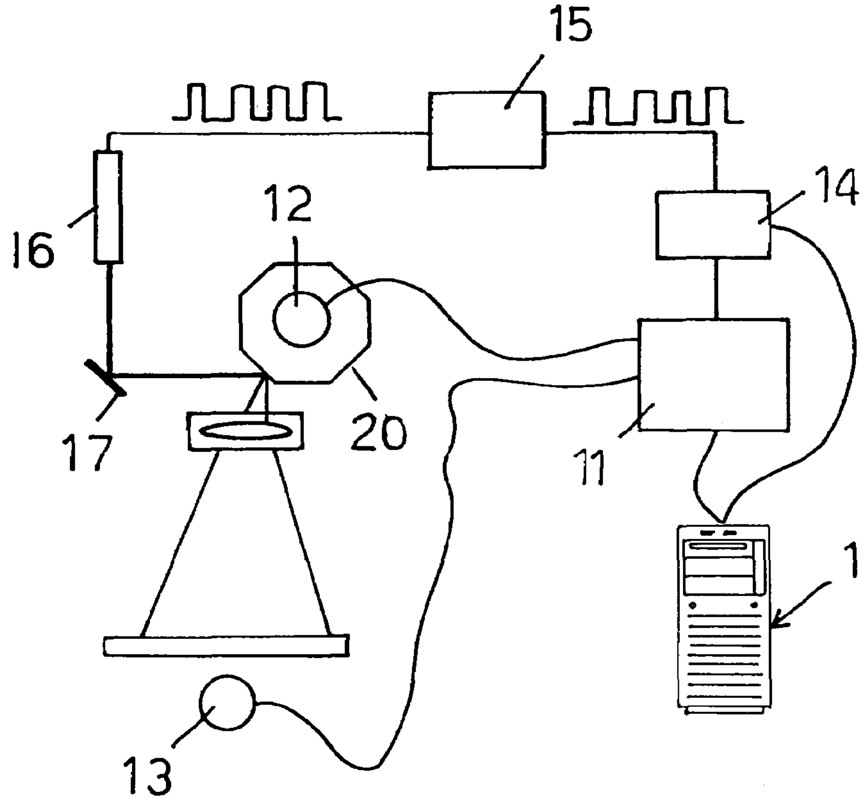
FIG. 2 schematically illustrates the operation principle of the photoengraving or photoetching assembly included in the automatic machine according to the present invention.

As is clearly shown in FIG. 2, the central control unit 1 is operatively coupled to a synchronizer 11, driving an encoder

12 controlling a polygonal mirror, which will be disclosed hereinafter, and an encoder 13 related to the screen printing frame or plate position.

More specifically, said synchronizer 11 is coupled to a modulator 14 controlling a power supply source 15 for a laser 16 adapted to emit a light beam to be sent on the screen printing frame.

Figure 3:
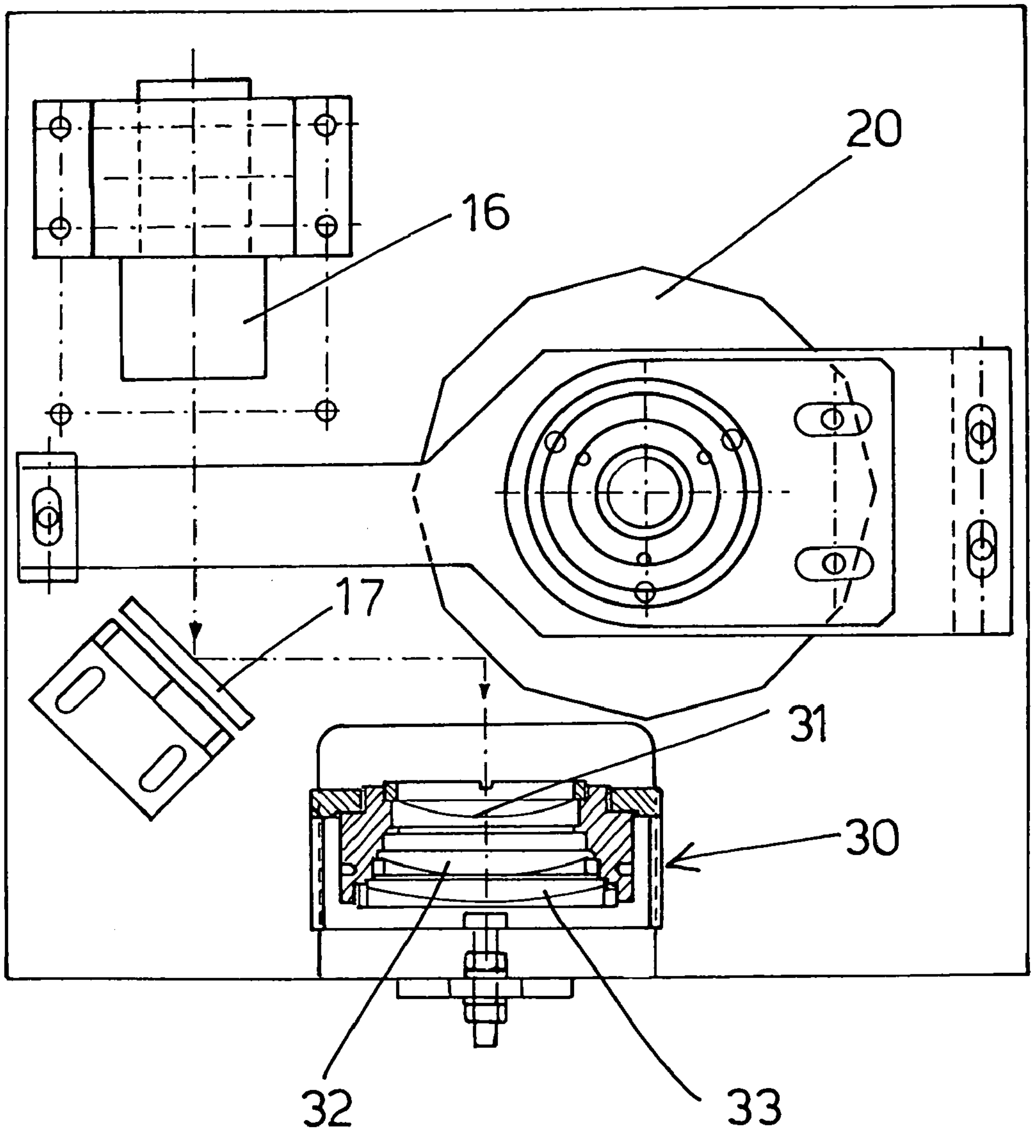
FIG. 3 is a front view illustrating the photoengraving or photoetching assembly.
Figure 4:
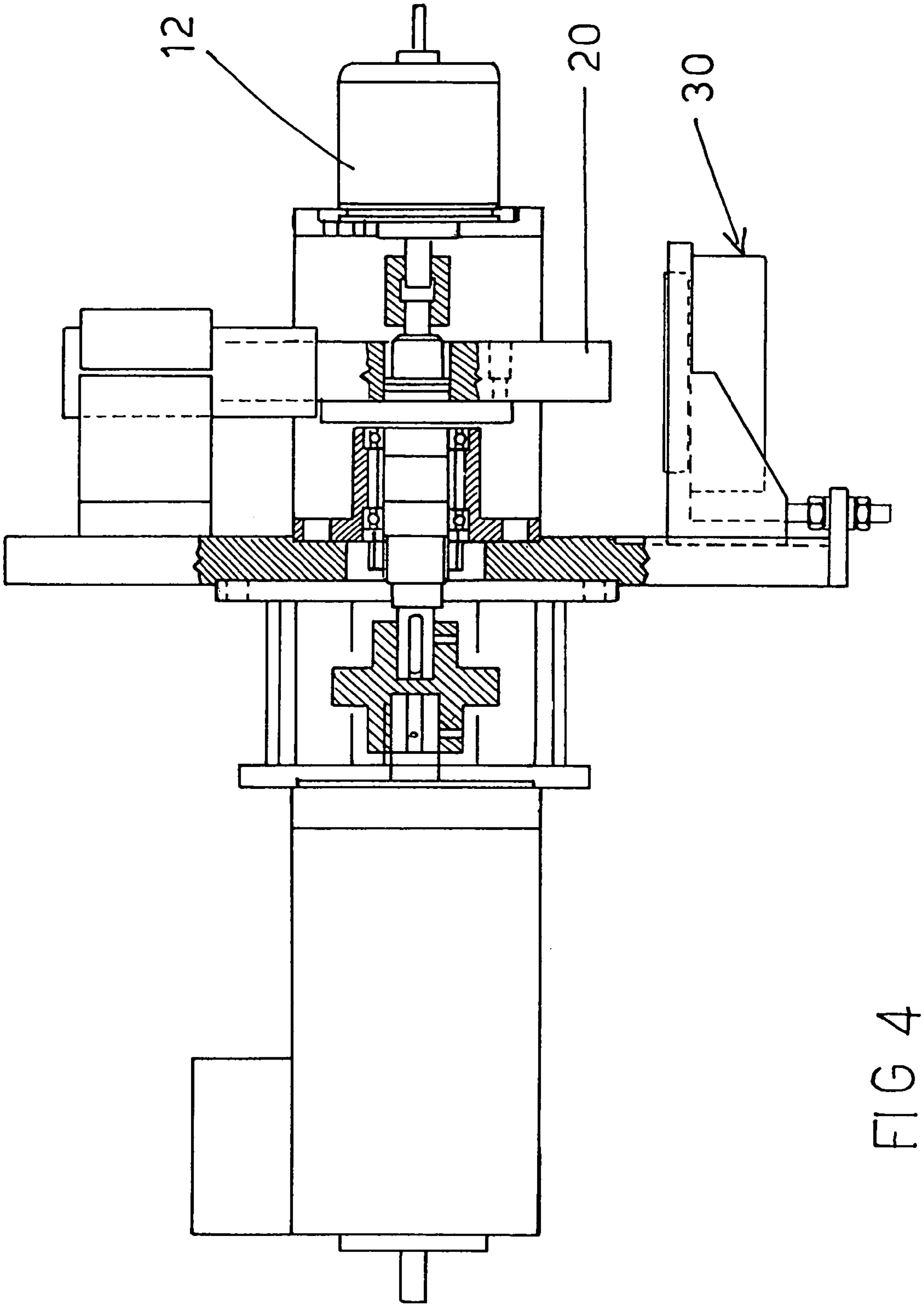
FIG. 4 is a partially cross-sectioned side elevation view illustrating the photoengraving assembly.

To that end, as is shown in FIG. 3, the beam provided by the laser 16 will impinge on a flat fixed mirror 17, in turn sending the beam to a rotary mirror 20, controlled by said encoder 12, so as to synchronize the displacement thereof with that of the frame 10 on the working plane of the photoengraving assembly.

The laser beam, sent by the rotary mirror to a flat field lens, generally indicated by the reference number 30, will pass through a first flat-concave lens, indicated by the reference number 31, a second concave-convex lens, indicated by the reference number 32 and a third flat-convex lens, indicated by the reference number 33.

The above optical assembly will operate to emit a modulated beam, adapted to provide a very high image definition accuracy.

In this connection it should be pointed out that the movement of the rotary mirror 20 is synchronized or timed with the movement of the screen printing frame 10 conveyor, in turn controlled by the mentioned encoder 13.

The screen printing frames or plates can be driven, as shown in FIGS. 5 to 7, by a screw system, provided for alternatively displacing or driving centering pegs 41.

The latter will convey or entrain the screen printing frame from their loading station under the photoengraving assembly and then to the unloading magazine.

Then, said centering pegs will return to their starting position, for taking up a further screen printing frame.

Figure 10:
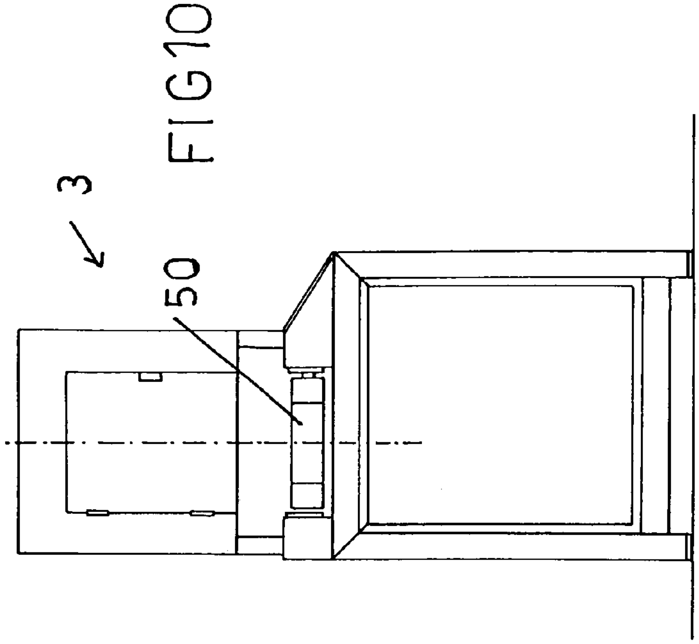
FIG. 10 is a further side elevation view illustrating the automatic machine shown in FIG. 8.
Figure 8:
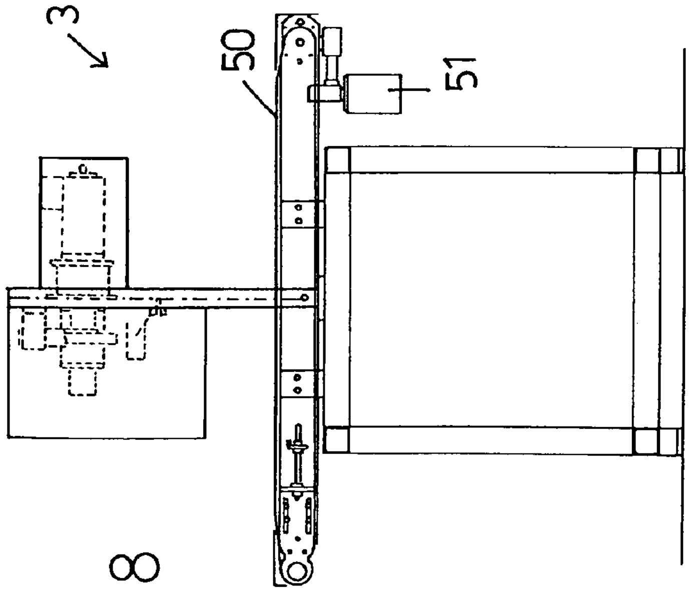
FIG. 8 is a further front elevation view illustrating the automatic machine according to the present invention including a belt conveyor.
Figure 9:
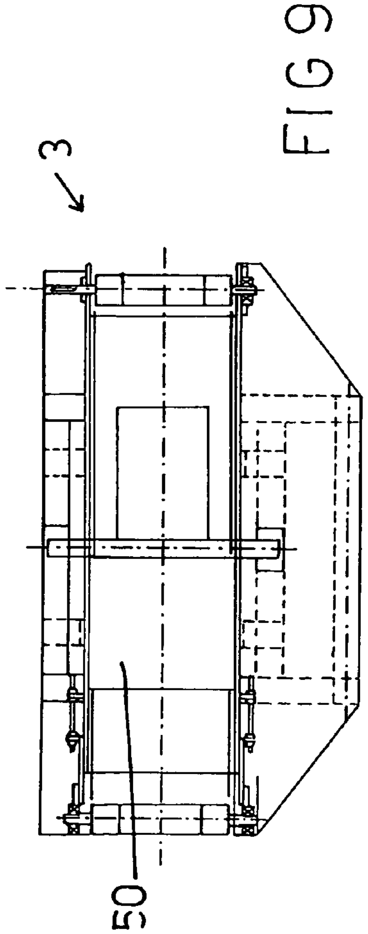
FIG. 9 is a top plan view illustrating the automatic machine shown in FIG. 8.

Optionally, the screen printing frame, as shown in FIGS. 8 to 10, can comprise a belt conveyor, generally indicated by the reference number 50, which is rotatively driven by an operating assembly, indicated by the reference number 51, designed for conveying the printing frame in a synchronized or timed manner.

On the screen printing frame, a screen printing plate including a photosensitive film is provided, said screen printing plate being affected by a laser light source, having a wavelength of 405 nm.

In particular, the laser light is emitted, as stated, by the laser source and passes through the above disclosed optic chain, and, as driven by the polygonal mirror, will impinge on the frame photosensitive film.

More specifically, the polygonal mirror will direct the point-like light beam to the photosensitive film, thereby causing the photosensitive film layer to cure at set points, since the flat field lens will linearize the light beam, thereby preventing any beam distortion and aberration phenomena from occurring.

In particular, the photosensitive film portion not affected by the light beam can be solubilized, by using water or any other suitable solutions.

From the above disclosure, it should be apparent that the invention fully achieves the intended aim and objects.

In fact, the invention provides a fully automatic machine allowing to photoengrave, in a continuous operation cycle, screen printing plates for screen printing high quality CD's, which machine can be easily controlled, owing to the provision of the disclosed central control unit.

Said central control unit, in particular, will control the laser beam, by modulating it depending on the signals coming from the above disclosed encoders controlling both the conveyor and the rotary polygonal mirror, which is designed for displacing the light beam.

The invention, as disclosed, is susceptible to several modifications and variations, all of which will come within the inventive idea.

Moreover, all the constructional details can be replaced by other technically equivalent elements.

In practicing the invention, the used materials, as well as the contingent size and shapes can be any, depending on requirements.

The invention claimed is:

1. An automatic machine for photoengraving screen printing plates for screen printing high quality CD's, characterized in that said automatic machine comprises a central control unit operatively coupled to a photoengraving station including a screen printing frame conveyor for conveying screen printing frames under a screen printing photoengraving assembly adapted to scan a laser beam by a polygonal mirror and a flat-field lens.

2. An automatic machine, according to the preceding claim, characterized in that said automatic machine comprises moreover a screen printing frame loading station arranged upstream a photoengraving station and a screen printing unloading station arranged downstream of said photoengraving station.

3. An automatic machine, according to claim 1, characterized in that said polygonal mirror is a rotary polygonal mirror.

4. An automatic machine, according to claim 1, characterized in that said central control unit is operatively coupled to a synchronizer and a modulator, driven by said synchronizer, which is operatively coupled to a control encoder for controlling said polygonal mirror and a further control encoder for controlling a position of said screen printing frame on said conveyor.

5. An automatic machine, according to claim 4, characterized in that said modulator drives a laser supply source, said laser being designed for emitting a laser beam deflected by a fixed mirror to said polygonal mirror, the beam of said polygonal mirror being sent to said flat field lens.

6. An automatic machine, according to claim 5, characterized in that said flat field lens comprises a first flat-concave lens, a second concave-convex lens and a third flat-convex lens.

7. An automatic machine, according to claim 1, characterized in that said conveyor comprises a longitudinal extending conveyor screw, including removable coupling means for removably coupling said screening frames and being controlled by a screening frame position controlling encoder.

8. An automatic machine, according to claim 1, characterized in that said screen printing frame conveyor comprises an endless conveyor belt driven by a driving assembly in turn controlled by said screen printing frame position controlling encoder.

* * * * *